Sept. 23, 1930.                J. T. GRADY                1,776,501
                    ROASTER FOR WIENERS AND THE LIKE
                      Filed April 11, 1928    2 Sheets-Sheet 1
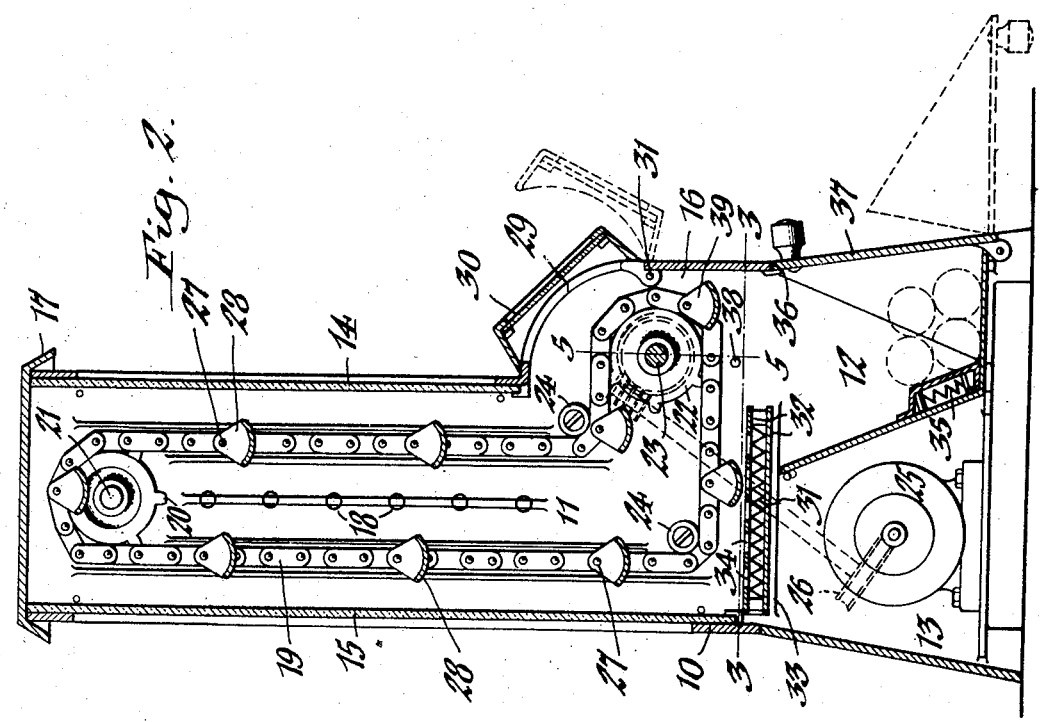
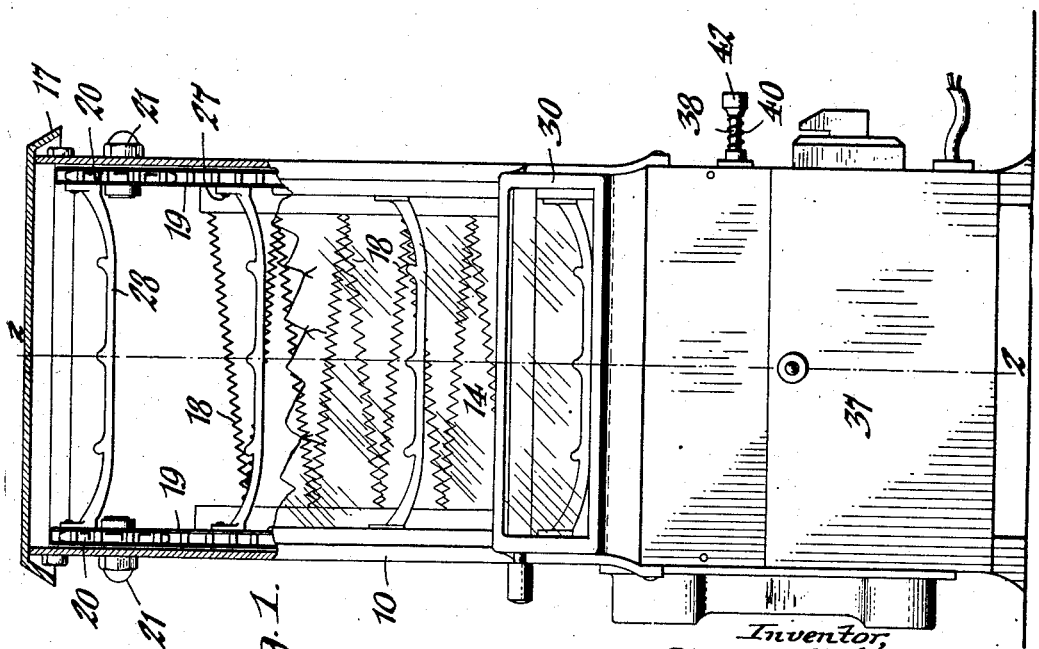
Inventor,
James T. Grady,
by Geyer & Geyer
Attorneys.

Sept. 23, 1930.  J. T. GRADY  1,776,501
ROASTER FOR WIENERS AND THE LIKE
Filed April 11, 1928   2 Sheets-Sheet 2
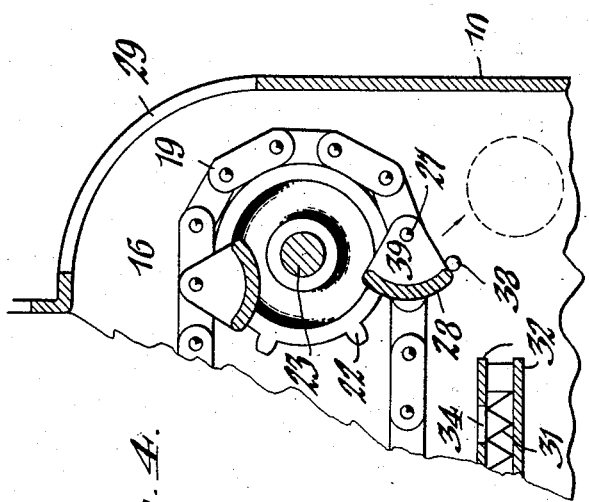
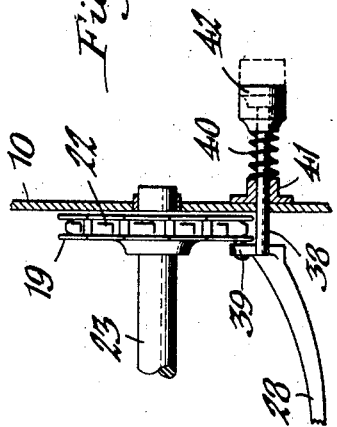
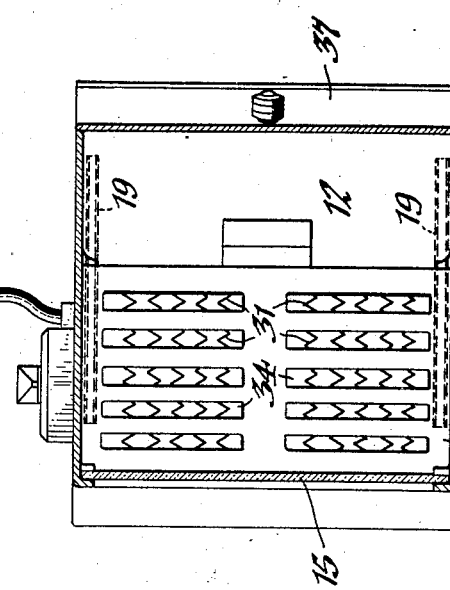
Inventor,
James T. Grady,
by Geyer & Geyer
Attorneys.

Patented Sept. 23, 1930

1,776,501

UNITED STATES PATENT OFFICE

JAMES T. GRADY, OF WANOMASSA, NEW JERSEY

ROASTER FOR WIENERS AND THE LIKE

Application filed April 11, 1928. Serial No. 269,109.

This invention relates generally to improvements in cooking apparatus, but more particularly to a roaster for wieners and similar articles of food and of the type designed to convey the foodstuff through radiated heat waves within an enclosure.

One of its objects is the provision of a sanitary and economical roaster of this character which is so constructed as to provide a maximum amount of heat radiation to thoroughly and expeditiously roast wieners and the like at a minimum cost.

Another object of the invention is to provide means for facilitating the ready feeding of the wieners to the roaster without undue loss of heat from the roasting chamber and to provide simple and reliable means for effecting the automatic discharge of the roasted wieners from their carriers.

Other features of the invention reside in the novel construction and arrangement of parts hereinafter more fully described and particularly pointed out in the appended claims.

In the accompanying drawings:—

Figure 1 is a front view of the improved roaster. Figure 2 is a transverse vertical section thereof on line 2—2, Figure 1. Figure 3 is a horizontal section on line 3—3, Figure 2. Figure 4 is an enlarged fragmentary transverse section showing a wiener-rack tripped to a position for discharging the wieners therefrom. Figure 5 is an enlarged fragmentary vertical section on line 5—5, Figure 2.

Similar characters of reference indicate corresponding parts throughout the several views.

In the preferred embodiment of the invention shown in the drawings, the same comprises a suitable casing 10, of appropriate dimensions, in which the various working parts of the roaster are mounted and which is constructed to provide a heating chamber 11 wherein the wieners or other articles of food are cooked or roasted, a warming chamber 12 disposed at the lower front end of the casing for keeping the articles hot after being roasted, and a compartment 13 arranged rearwardly of the warming chamber and isolated from the latter and said heating chamber. The front and rear walls 14 and 15, respectively, of the heating chamber are made of glass or other transparent material so that the roasting of the foodstuffs may be observed by the operator and interested patrons. As shown in Figure 2, the heating chamber 11 is substantially L-shaped and the lower forwardly-offset horizontal portion or extension 16 thereof opens directly into the warming chamber 12, while the top of its upright portion is normally closed by a detachable cap or cover 17, whereby access to such portion of the heating chamber may be conveniently had whenever desired.

Disposed substantially centrally in a vertical position in the upright portion of the heating chamber 11 is a removable heating element 18, preferably of the electrical type, which terminates at its lower end adjacent to the offset portion 16 of said chamber. A suitable conveyor for the wieners is provided for carrying them in a path about the heating element, that shown in the drawings, by preference, consisting of a pair of laterally spaced sprocket chains 19 disposed within the heating chamber adjacent to the side walls thereof and passing at their upper ends around sprocket wheels 20 mounted on corresponding stud-shafts 21 journaled in the casing side walls. The lower ends of these sprocket chains extend forwardly into the offset portion 16 of the heating chamber and pass around similar sprocket wheels 22 fixed on a horizontal shaft 23. At the junction of their resulting upright and horizontal stretches, these chains pass around suitable guide rollers 24. Motion may be transmitted to the sprocket chains at a comparatively slow speed by an electric motor 25 housed in the compartment 13 and connected with the shaft 23 by suitable reduction gearing 26.

Pivotally mounted between the chains 19 on pins 27 are pendant food supports or racks 28 which may be of any desired configuration and which are designed, in the example shown, to carry wieners or like articles. These racks are constantly held in a pendant position, so that the wieners, when conveyed upwardly and downwardly about the heating element 18, are roasted first on one side and then on the other.

In its top and adjoining front side, the offset portion 16 of the heating chamber has a filling opening 29 through which the articles of food may be admitted and placed on the racks 28 as they successively pass such opening. The latter is normally closed by a suitable door 30 hinged at 31 to the rear wall of the casing 10.

A supplementary heating element 31 is arranged horizontally in the lower rear end of the heating chamber 11 immediately below the bottom stretch of the conveyor 19, the heat from this element being directed upwardly and serving to assist the roasting of the wieners, particularly their bottom sides. Said heating element 31 is preferably disposed between a pair of asbestos panels 32 supported at their ends on ledges 33 formed on the side walls of the casing, the upper panel having heat-radiating slots 34 formed therein.

The warming chamber 12 is provided at its lower end with a heating element 35 of the required capacity to keep the wieners in a warmed condition after being roasted. This chamber has a discharge opening 36 normally closed by a vertically-swinging door 37.

After being roasted, the wieners are discharged from their racks 28 into the warming chamber. The preferred means for so discharging the wieners consists of a trip device controlled by the operator for automatically effecting the swinging of the racks to a position for permitting the wieners to drop by gravity into the warming chamber. To this end a trip pin 38 is provided which is slidably mounted in one of the side walls of the casing at a point opposite the lower horizontal stretch of the conveyor chains 19 so as to be shiftable into and out of the path of movement of the rack-suspension ears 39 and below the pivots thereof. Normally this trip pin is held clear of the racks by a coil spring 40 which bears at one end against its bearing collar 41 and at its other end against its actuating knob 42. When it is desired to swing a rack to the position shown in Figure 4, for effecting the automatic discharge of a wiener, the operator presses the trip pin inwardly into the path of the opposing front edge of the approaching rack, so that when its ear 39 encounters the trip pin, the rack is swung upwardly and rearwardly about its pivot pins 27. After riding over and passing the trip pin, the rack assumes its normal pendant position ready to receive another wiener as it comes opposite the filling opening 29.

I claim as my invention:—

1. A cooking apparatus of the character described, comprising a casing having a heating chamber including a lateral extension at one end, heating elements disposed in said chamber and in its extension, and means for conveying food past said heating elements, said conveying means passing around opposite sides of one of the heating elements and along one side of the other heating element.

2. A cooking apparatus of the character described, comprising a casing containing a heating chamber including a lateral extension at one end having a filling opening, heating elements disposed in said chamber and in the extension thereof, and means for conveying food past said heating elements and said filling opening, said conveying means passing around opposite sides of one of the heating elements and along one side of the other heating element.

3. A cooking apparatus of the character described, comprising a casing having a substantially L-shaped heating chamber, an endless food conveyor arranged in the upright and horizontal portions of said chamber, a heating element disposed in the upright portion of said chamber and about which the upward and downward stretches of the conveyor travel, and a supplementary heating element disposed in the horizontal portion of said chamber adjacent to one of the horizontal stretches of the conveyor.

4. A cooking apparatus of the character described, comprising a casing having a substantially L-shaped heating chamber, an endless food conveyor arranged in the upright and horizontal portions of said chamber, a heating element disposed in the upright portion of said chamber and about which the upward and downward stretches of the conveyor travel, a supplementary heating element disposed in the horizontal portion of said chamber adjacent to one of the horizontal stretches of the conveyor, said horizontal portion of the heating chamber having a filling opening disposed opposite the other horizontal stretch of said conveyor, and a closure for said filling opening.

5. A cooking apparatus of the character described, comprising a casing containing a heating chamber having a forwardly-facing extension at its lower end, a heating element disposed in said chamber, an endless food conveyor arranged in said chamber for traveling past said heating element, and a warming chamber in communication with the extension of said heating chamber.

6. A cooking apparatus of the character described, comprising a casing having a heating chamber in its upper portion and a communicating warming chamber in its lower portion, heating elements in said chambers, respectively, and means in said heating chamber for conveying food past the heating element therein and over the communicating upper end of said warming chamber.

7. A cooking apparatus of the character described, comprising a casing having a heating chamber in its upper portion and a communicating warming chamber in its lower portion, heating elements in said chambers, respectively, means in said heating chamber for conveying food past the heating element therein and over the communicating upper end of said warming chamber, and means for effecting the automatic discharge of the food from the conveyor into the warming chamber at a predetermined point in its path of travel.

8. A cooking apparatus of the character described, comprising a casing having a heating chamber in its upper portion and a communicating warming chamber in its lower portion, a heating element in said heating chamber, an endless conveyor arranged to travel past the heating element, tiltable food supports carried by said conveyor, and means for tilting said supports to a position to discharge their contents into said warming chamber at a predetermined point in the movement of the conveyor.

9. A cooking apparatus of the character described, comprising a casing having a heating chamber in its upper portion and a communicating warming chamber in its lower portion, a heating element in said heating chamber, an endless conveyor arranged to travel past the heating element, pendant food supports fulcrumed on said conveyor, and a trip device projectable across the path of travel of said supports for selectively swinging them to a position to discharge their contents into the warming chamber.

JAMES T. GRADY.